US012121933B2

(12) United States Patent
Zhao et al.

(10) Patent No.: US 12,121,933 B2
(45) Date of Patent: Oct. 22, 2024

(54) VIBRATION DEVICE

(71) Applicant: Jinan Haote Innovation Management and Consulting Partnership (Limited Partnership), Jinan (CN)

(72) Inventors: Xianhua Zhao, Jinan (CN); Yang Wang, Jinan (CN); Xiujuan Liu, Jinan (CN); Zhiming Zhao, Jinan (CN)

(73) Assignee: Jinan Haote Innovation Management and Consulting Partnership (Limited Partnership), Jinan (CN)

( * ) Notice: Subject to any disclaimer, the term of this patent is extended or adjusted under 35 U.S.C. 154(b) by 379 days.

(21) Appl. No.: 17/632,290

(22) PCT Filed: Jul. 28, 2020

(86) PCT No.: PCT/CN2020/105178
§ 371 (c)(1),
(2) Date: Feb. 2, 2022

(87) PCT Pub. No.: WO2021/027558
PCT Pub. Date: Feb. 18, 2021

(65) Prior Publication Data

US 2022/0280974 A1 Sep. 8, 2022

(30) Foreign Application Priority Data

Aug. 9, 2019 (CN) ......................... 201921289132.5

(51) Int. Cl.
*B06B 1/16* (2006.01)

(52) U.S. Cl.
CPC ...................................... *B06B 1/16* (2013.01)

(58) Field of Classification Search
CPC ........... B06B 1/16; B06B 1/162; B06B 1/166; F16H 25/186; F16H 25/12; F16H 37/16;
(Continued)

(56) References Cited

U.S. PATENT DOCUMENTS 3,287,983 A * 11/1966 Austin .................... B06B 1/162 74/61
4,614,123 A * 9/1986 Tompkins ............... F16N 7/366 74/467
(Continued)

FOREIGN PATENT DOCUMENTS

CN 1931450 A 3/2007
CN 203270422 U 11/2013
(Continued)

OTHER PUBLICATIONS

"International Application No. PCT/CN2020/105178, International Search Report and Written Opinion mailed Nov. 2, 2020", (Nov. 2, 2020), 9 pgs.

*Primary Examiner* — Victor L MacArthur
(74) *Attorney, Agent, or Firm* — Schwegman Lundberg & Woessner, P.A.

(57) ABSTRACT

A vibration device belongs to the field of vibration machinery technologies, and includes an eccentric vibrator, a vibration motor, and a servo linear motion system. The eccentric vibrator includes at least a first eccentric body, a second eccentric body, and a connecting shaft. At least one of the first eccentric body or the second eccentric body is connected to the connecting shaft by a spiral groove and a boss structure matching the spiral groove. The servo linear motion system is connected to the connecting shaft. The servo linear motion system pushes the connecting shaft to move linearly, and drives the second eccentric body to rotate in a circumferential direction, and the first eccentric body remains stationary, so that adjustment of relative positions of the first eccentric body and the second eccentric body in the circumferential direction is implemented, and the purpose of controlling the magnitude of an exciting force in real time in a working process of equipment is implemented.

27 Claims, 3 Drawing Sheets

(58) Field of Classification Search
CPC .......... F16H 19/02; F16H 19/08; F16H 21/40; F16H 37/124; F16H 21/50; F16H 25/08; F16H 25/14; F16H 2025/2043; F16H 21/16; F16H 21/52; F16H 27/02; F16H 21/54; F16H 25/2018; F16H 19/0622; F16H 19/001; F16H 19/005; F16H 1/16; F16H 25/20; F16H 55/22; F16H 57/039; F16H 2057/0213; F16H 2025/209; F16H 1/225; F16H 1/166; F16H 25/122; F16H 57/0498; F16H 57/0497; F16H 2025/2445
USPC ....... 74/10.85, 20, 21, 25, 58, 59, 89, 89.14, 74/89.23, 89.34, 425, 424.7, 458, 500, 74/724, 841
See application file for complete search history.

(56) References Cited

U.S. PATENT DOCUMENTS

| | | | | |
|---|---|---|---|---|
| 9,239,101 | B2 * | 1/2016 | Duan | F16H 25/12 |
| 11,891,761 | B2 * | 2/2024 | Wollanek | E01B 27/20 |
| 2022/0288638 | A1 * | 9/2022 | Zhao | B06B 1/166 |

FOREIGN PATENT DOCUMENTS

| | | | |
|---|---|---|---|
| CN | 106733572 | A | 5/2017 |
| CN | 111229580 | A | 6/2020 |
| CN | 111250378 | A | 6/2020 |
| JP | 3419368 | B2 | 4/2003 |
| SU | 1009526 | A1 | 4/1983 |
| WO | WO-2021027558 | A1 | 2/2021 |

* cited by examiner

VIBRATION DEVICE

PRIORITY CLAIM TO RELATED APPLICATIONS

This application is a U.S. national stage filing under 35 U.S.C. § 371 from International Application No. PCT/CN2020/105178, filed on 28 Jul. 2020, and published as WO2021/027558 on 18 Feb. 2021, which claims the benefit under 35 U.S.C. 119 to Chinese Application No. 201921289132.5, filed on 9 Aug. 2019, the benefit of priority of each of which is claimed herein, and which applications and publication are hereby incorporated herein by reference in their entirety.

TECHNICAL FIELD

The present invention belongs to the field of vibration machinery technologies, and specifically, to a vibration device mounted on vibration machinery equipment.

BACKGROUND

A vibration device is a device mounted on vibration machinery equipment and configured to generate an exciting force. The vibration device is a main component of vibration machinery and plays a decisive role in a mechanical vibration mode. Vibration machinery equipped with vibration devices is widely applied to metallurgical mines, industrial production, engineering construction, experimental equipment, and other industries, to implement screening, transportation, compaction, vibration aging, mold forming, and the like of objects. Currently, an existing mechanical vibration device is mainly formed by a motor and an eccentric vibrator, and the motor drives the motion of the eccentric vibrator to generate mechanical vibration. Such a vibration device can only control a vibration frequency by controlling a rotational speed of a vibration motor, and it is not easy to perform amplitude control (exciting force control). The vibration motor needs to be stopped to manually adjust the eccentricity of the vibration device to control the exciting force. For different vibration parameters, an actual operation process is very complex. The vibration motor requires repeated stop, eccentricity adjustment, frequency adjustment, and start to approach the optimal vibration parameters. The step of eccentricity adjustment only includes steps such as loosening of an eccentric set screw, eccentricity adjustment, and tightening of the eccentric set screw. In addition, the adjustment accuracy is poor, the eccentricity adjusted in a stationary state is difficult to reach an optimal exciting force parameter during working, and can only be “close” or “similar” to the optimal exciting force parameter. The exciting force cannot be dynamically adjusted during working. Another disadvantage of a conventional vibration device is that if a workpiece requires a large exciting force, the vibration device needs to be adjusted to large eccentricity during stop. When the vibration motor is started with relatively large eccentricity, due to the large start load, the current of the vibration motor is increased, and electrical components are prone to burnout or the motor is prone to damage.

SUMMARY

In view of the deficiencies in the prior art, the present invention provides a vibration device that can control the magnitude of an exciting force in real time in a working process of equipment.

A vibration device includes an eccentric vibrator and a vibration motor (8) configured to drive the eccentric vibrator to rotate, and further includes a servo linear motion system (9) configured to adjust an eccentricity of the eccentric vibrator. The eccentric vibrator includes at least a first eccentric body (1), a second eccentric body (2), and a connecting shaft (5). At least one of the first eccentric body (1) or the second eccentric body (2) is connected to the connecting shaft (5) by a spiral groove and a boss structure matching the spiral groove. The servo linear motion system (9) is connected to the connecting shaft (5).

A first structure of the eccentric vibrator is as follows. The first eccentric body (1) and the second eccentric body (2) are arranged side by side in a transverse direction. The first eccentric body (1) is a left eccentric body, the second eccentric body (2) is a right eccentric body, and centers of gravity of the second eccentric body (2) and the first eccentric body (1) both deviate from a rotation center formed by the connecting shaft (5). The first eccentric body (1) is fixedly connected to an output shaft of the vibration motor (8). The servo linear motion system (9) and the connecting shaft (5) are fixedly connected in an axial direction and rotatably connected in a circumferential direction of a surface.

The first eccentric body (1) is connected to the connecting shaft (5) by a linear groove and a boss structure matching the linear groove. The second eccentric body (2) is connected to the connecting shaft (5) by a spiral groove and a boss structure matching the spiral groove.

In a further solution, a left pillow block (10) is disposed on the first eccentric body (1), and a first shaft hole (11) is provided in the left pillow block (10).

Further, the output shaft of the vibration motor (8) is fixed on a left part of the first shaft hole (11) by a keyway fit.

Further, a linear groove is provided in a right-side part of the first shaft hole (11), and a first boss matching the linear groove is disposed on a left side of the connecting shaft (5). A second shaft hole (21) is provided in the second eccentric body (2), a spiral groove is provided in the second shaft hole (21), and a second boss matching the spiral groove is provided on a right side of the connecting shaft (5).

Preferably, at least two first bosses are disposed on a track line matching the linear groove; and at least two second bosses are disposed on a track line matching the spiral groove.

Alternatively, a linear groove is provided on the left side of the connecting shaft (5), and a third boss matching the linear groove is provided in the first shaft hole (11); and a spiral groove is provided on the right side of the connecting shaft (5), and a fourth boss matching the spiral groove is disposed in the second shaft hole (21).

Preferably, at least two third bosses are disposed on a track line matching the linear groove; and at least two fourth bosses are disposed on a track line matching the spiral groove.

A working principle of the vibration device is as follows.

The output shaft of the vibration motor (8) drives the first eccentric body (1) to rotate synchronously around a rotation center, the first eccentric body (1) drives the connecting shaft (5) to rotate synchronously, and the connecting shaft (5) drives the second eccentric body (2) to rotate synchronously, thereby implementing synchronous rotation of the first eccentric body (1) and the second eccentric body (2) to output a stable exciting force. When the eccentricity of the eccentric vibrator needs to be adjusted, the servo linear motion system (9) is started to act. The servo linear motion system (9) pushes the connecting shaft (5) to move linearly, and drives the second eccentric body (2) to rotate in a circumferential direction, and the first eccentric body (1) remains stationary, so that adjustment of relative positions of the first eccentric body (1) and the second eccentric body (2) in the circumferential direction is implemented. When the eccentric vibrator is adjusted to the required eccentricity, the servo linear motion system (9) is stopped, the position of the connecting shaft (5) is locked, and the adjusted stable exciting force is outputted.

In an improved measure of the foregoing solution, a servo linear motion system actuating mechanism (91) of the servo linear motion system (9) is connected to the connecting shaft (5) by a third bearing (15). The servo linear motion system (9) controls an axial position of the servo linear motion system actuating mechanism (91), and may lock the position at any position within a stroke range.

Further, a shaft hole (92) is provided at a tail end of the servo linear motion system actuating mechanism (91) of the servo linear motion system (9), and the connecting shaft (5) is connected to the servo linear motion system actuating mechanism (91) by the shaft hole (92) and then by the third bearing (15), and an outer ring of the third bearing (15) is fixedly connected to the shaft hole (92) by a hole elastic retaining ring (13); and an inner ring of the third bearing (15) is fixedly connected to the connecting shaft (5) by a shaft elastic retaining ring (16).

The servo linear motion system (9) may be a hydraulic cylinder, a pneumatic cylinder, a servo linear motor, or another servo linear motion system. Correspondingly, the servo linear motion system actuating mechanism (91) is a hydraulic rod, a cylinder rod, a screw rod, or the like.

Preferably, the servo linear motion system (9) is a servo linear motor, and the servo linear motion system actuating mechanism (91) is a screw rod.

A second structure of the eccentric vibrator is as follows. The first eccentric body (1) and the second eccentric body (2) are arranged in an inside-outside direction. The first eccentric body (1) is an outer eccentric body, the second eccentric body (2) is an inner eccentric body, the first eccentric body (1) has an inner circumferential surface, the second eccentric body (2) has an outer circumferential surface, and at least one first bearing (41) is disposed between the inner circumferential surface of the first eccentric body (1) and the outer circumferential surface of the second eccentric body (2). Centers of gravity of the second eccentric body (2) and the first eccentric body (1) both deviate from a rotation center formed by the connecting shaft (5).

An output shaft of the vibration motor (8) is fixedly connected to the first eccentric body (1).

The second eccentric body (2) and the connecting shaft (5) are connected by a spiral groove and a boss structure matching the spiral groove.

The first eccentric body (1) and the connecting shaft (5) are connected by a linear groove and a boss structure matching the linear groove.

A working principle of the vibration device is as follows.

The output shaft of the vibration motor (8) drives the first eccentric body (1) to rotate synchronously around a rotation center, the first eccentric body (1) drives the connecting shaft (5) to rotate synchronously, and the connecting shaft (5) drives the second eccentric body (2) to rotate synchronously, thereby implementing synchronous rotation of the first eccentric body (1) and the second eccentric body (2) to output a stable exciting force. When the eccentricity of the eccentric vibrator needs to be adjusted, the servo linear motion system (9) is started to act. The servo linear motion system (9) pushes the connecting shaft (5) to move linearly, and drives the second eccentric body (2) to rotate in a circumferential direction, and the first eccentric body (1) remains stationary, so that adjustment of relative positions of the first eccentric body (1) and the second eccentric body (2) in the circumferential direction is implemented. When the eccentric vibrator is adjusted to the required eccentricity, the servo linear motion system (9) is stopped, the position of the connecting shaft (5) is locked, and the adjusted stable exciting force is outputted.

In an improvement of the foregoing solution, a servo linear motion system actuating mechanism (91) of the servo linear motion system (9) is connected to the connecting shaft (5) by a third bearing (15). The servo linear motion system (9) controls an axial position of the servo linear motion system actuating mechanism (91), and may lock the position at any position within a stroke range.

The servo linear motion system (9) may be a hydraulic cylinder, a pneumatic cylinder, a servo linear motor, or another servo linear motion system. Correspondingly, the servo linear motion system actuating mechanism (91) is a hydraulic rod, a cylinder rod, a screw rod, or the like.

Preferably, the servo linear motion system (9) is a servo linear motor, and the servo linear motion system actuating mechanism (91) is a screw rod.

A left pillow block (10) coaxial with the first bearing (41) is disposed in the first eccentric body (1), and a first shaft hole (11) coaxial with the first bearing (41) is provided in the left pillow block (10).

An output shaft of the vibration motor (8) is fixedly connected to the first eccentric body (1) by the first shaft hole (11).

Further, the output shaft of the vibration motor (8) is fixed in the first shaft hole (11) of the left pillow block (10) in the first eccentric body (1) by a keyway fit.

A second shaft hole (21) is provided in the second eccentric body (2). The connecting shaft (5) and the second shaft hole (21) are connected by a spiral groove and a boss structure matching the spiral groove.

Further, a right end cover (3) is disposed on a right side of the first eccentric body (1) and the second eccentric body (2), and the right end cover (3) is fixedly connected to the first eccentric body (1). The right end cover (3) is closely attached to a right-side surface of an outer ring of the first bearing (41). A third shaft hole (31) coaxial with the first bearing (41) is disposed at the right end cover (3). The connecting shaft (5) and the third shaft hole (31) are connected by a linear groove and a boss structure matching the linear groove.

A shaft hole (92) is provided at a tail end of the servo linear motion system actuating mechanism (91) of the servo linear motion system (9), and the connecting shaft (5) is connected to the servo linear motion system actuating mechanism (91) by the shaft hole (92) and then by the third bearing (15). An outer ring of the third bearing (15) is fixedly connected to the shaft hole (92) by a hole elastic retaining ring (13), and an inner ring of the third bearing (15) is fixedly connected to the connecting shaft (5) by a shaft elastic retaining ring (16).

Preferably, a raised pressing ring (32) is disposed on a left side of the right end cover (3), and the pressing ring (32) abuts against the right-side surface of the outer ring of the first bearing (41).

In a further improved solution, a first inner step surface (12) is disposed on the inner circumferential surface of the first eccentric body (1) in a direction away from an axial center, a first outer step surface (22) is disposed on the outer circumferential surface of the second eccentric body (2) in a direction toward an axial center, the first inner step surface (12) and the first outer step surface (22) form a first step surface, and left side surfaces of an inner ring and the outer ring of the first bearing (41) are located on the first step surface.

Further, a retaining ring (25) is disposed on the outer circumferential surface of the second eccentric body (2), the retaining ring (25) is located on a right side of the inner ring of the first bearing (41), and the retaining ring (25) is fixedly connected to the second eccentric body (2).

Further, a second bearing (42) is disposed between the first eccentric body (1) and the second eccentric body (2). A first inner step surface (12) is disposed on the inner circumferential surface of the first eccentric body (1) in a direction away from an axial center. A convex ring (23) is disposed at a middle position of the outer circumferential surface of the second eccentric body (2) in a direction away from an axial center. A space for accommodating the second bearing (42) is formed between a left side step surface of the convex ring (23) and the first inner step surface (12), and a space for accommodating the first bearing (41) is formed between a right-side step surface of the convex ring (23) and the pressing ring (32) of the right end cover (3).

Further, a support ring (43) is disposed between the outer ring of the first bearing (41) and an outer ring of the second bearing (42).

Further, a first spiral groove (51) and a first linear groove (52) are sequentially disposed from left to right in the connecting shaft (5). A first boss (24) matching the first spiral groove (51) is disposed on an inner wall of the second shaft hole (21) of the second eccentric body (2), and a second boss (33) matching the first linear groove (52) is disposed on an inner wall of the third shaft hole (31) of the right end cover (3).

Preferably, at least two first bosses (24) are disposed on a track line matching the first spiral groove (51); and at least two second bosses (33) are disposed on a track line matching the first linear groove (52).

In another solution, a second spiral groove is provided on an inner wall of the second shaft hole (21) of the second eccentric body (2); a second linear groove is provided on an inner wall of the third shaft hole (31) of the right end cover (3); and a third boss matching the second spiral groove and a fourth boss matching the second linear groove are sequentially disposed from left to right in the connecting shaft (5).

Preferably, at least two third bosses are disposed on a track line matching the second spiral groove; and at least two fourth bosses are disposed on a track line matching the second linear groove.

Compared with the prior art, the vibration device provided by the present invention may adjust the magnitude of an eccentricity, that is, the magnitude of an exciting force, at any rotational speed. A vibrator is adjusted to a minimum eccentricity when being started, and after the vibrator is started and reaches a set speed, the eccentricity is adjusted to a set value, thereby effectively protecting electrical components and the vibration motor, and avoiding damage due to an excessive current. Through the adjustment of an exciting force during working of vibration equipment, parameters can be controlled more accurately. The whole exciting force adjustment in conjunction with electrical control may become simple and convenient, which is more suitable for automatic control in an entire vibration process.

Here, 1. first eccentric body; 10. left pillow block; 11. first shaft hole; 12. first inner step surface; 2. second eccentric body; 21. second shaft hole; 22. first outer step surface; 23. convex ring; 24. second boss; 25. retaining ring; 3. right end cover; 31. third shaft hole; 32. pressing ring; 33. third boss; 41. first bearing; 42. second bearing; 43. support ring; 5. connecting shaft; 51. spiral groove; 52. linear groove; 8. vibration motor; 9. servo linear motion system; 91. servo linear motion system actuating mechanism; 13. hole elastic retaining ring; 15. third bearing; and 16. shaft elastic retaining ring.

DETAILED DESCRIPTION

The present invention is described below in detail with reference to the accompanying drawings by way of example.

Embodiment 1

Figure 1:
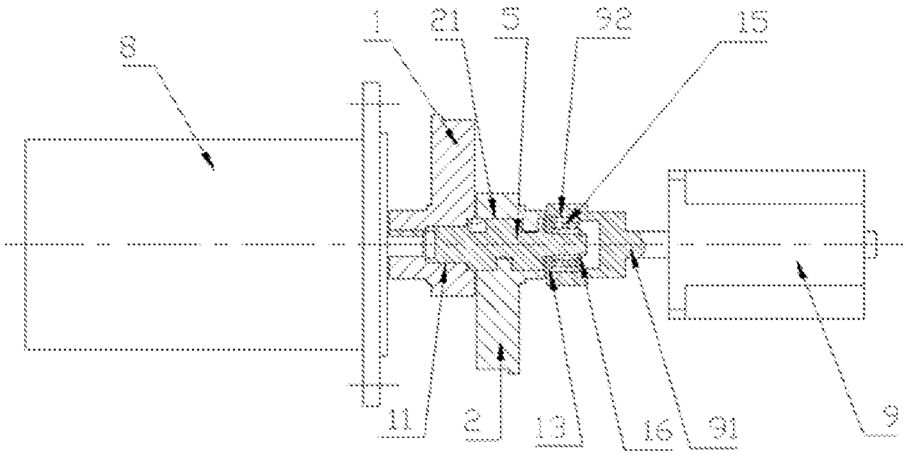
FIG. 1 is a schematic structural diagram of side-by-side arrangement of a first eccentric body 1 and a second eccentric body 2 in a transverse direction in Embodiments 1 to 4 of the present invention.

As shown in FIG. 1, a vibration device includes an eccentric vibrator, a vibration motor 8 configured to drive the eccentric vibrator to rotate, and a servo linear motion system 9 configured to adjust an eccentricity of the eccentric vibrator. The eccentric vibrator includes a first eccentric body 1, a second eccentric body 2, and a connecting shaft 5. The first eccentric body 1 and the second eccentric body 2 are arranged side by side in a transverse direction. The first eccentric body 1 is a left eccentric body, the second eccentric body 2 is a right eccentric body, and centers of gravity of the second eccentric body 2 and the first eccentric body 1 both deviate from a rotation center formed by the connecting shaft 5.

A left pillow block 10 is disposed on the first eccentric body 1, and a first shaft hole 11 is provided in the left pillow block 10. An output shaft of the vibration motor 8 is fixed on a left part of the first shaft hole 11 by a keyway fit.

A linear groove is provided in a right-side part of the first shaft hole 11, and a first boss matching the linear groove is disposed on the connecting shaft 5. A second shaft hole 21 is provided in the second eccentric body 2, a spiral groove is provided in the second shaft hole 21, and a second boss matching the spiral groove is provided on the connecting shaft 5. One or more first bosses may be disposed on a track line matching the linear groove. One or more the second bosses may be disposed on a track line matching the spiral groove. In the embodiment, there is one first boss and one second boss.

A servo linear motion system actuating mechanism 91 of the servo linear motion system 9 is connected to the connecting shaft 5 by a third bearing 15. The servo linear motion system 9 controls an axial position of the servo linear motion system actuating mechanism 91, and may lock the position at any position within a stroke range.

The servo linear motion system 9 may be a hydraulic cylinder, a pneumatic cylinder, a servo linear motor, or another servo linear motion system. Correspondingly, the servo linear motion system actuating mechanism 91 is a hydraulic rod, a cylinder rod, a screw rod, or the like.

In the embodiment, the servo linear motion system 9 is a servo linear motor, and the servo linear motion system actuating mechanism 91 is a screw rod.

A shaft hole 92 is provided at a tail end of the servo linear motion system actuating mechanism 91 of the servo linear motion system 9, and the connecting shaft 5 is connected to the servo linear motion system actuating mechanism 91 by the shaft hole 92 and then by the third bearing 15. An outer ring of the third bearing 15 is fixedly connected to the shaft hole 92 by a hole elastic retaining ring 13, and an inner ring of the third bearing 15 is fixedly connected to the connecting shaft 5 by a shaft elastic retaining ring 16.

Embodiment 2

Embodiment 2 is the same as Embodiment 1 except that there are two first bosses disposed on a track line matching the linear groove; and two second bosses are disposed on a track line matching the spiral groove.

Embodiment 3

Embodiment 3 is the same as Embodiment 1 except that a linear groove is provided on the left side of the connecting shaft 5, and a third boss matching the linear groove is provided in the first shaft hole 11; and a spiral groove is provided on a right side of the connecting shaft 5, and a fourth boss matching the spiral groove is disposed in the second shaft hole 21.

One or more third bosses may be disposed on a track line matching the linear groove. One or more fourth bosses may be disposed on a track line matching the spiral groove. In the embodiment, there is one third boss and one fourth boss.

Embodiment 4

Embodiment 4 is the same as Embodiment 3 except that two third bosses are disposed on a track line matching the linear groove; and two fourth bosses disposed on a track line matching the spiral groove.

Embodiment 5

Figure 2:
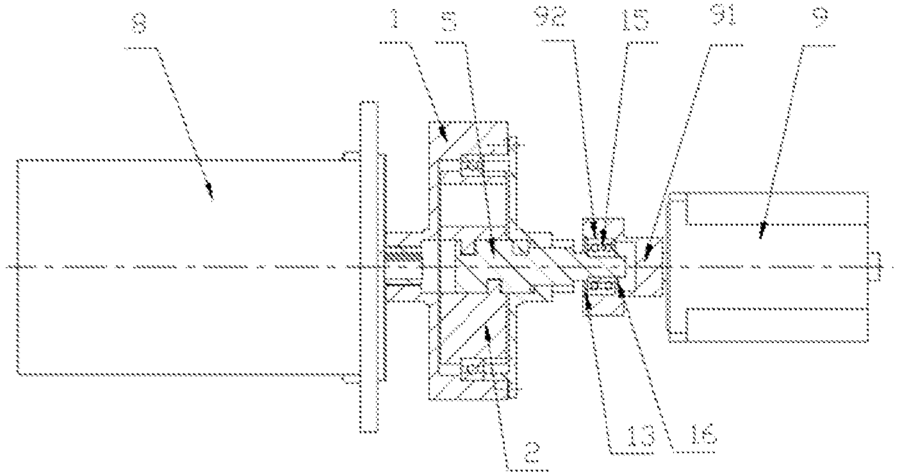
FIG. 2 is a schematic structural diagram of arrangement of the first eccentric body 1 and the second eccentric body 2 in an inside-outside direction in Embodiments 5 to 7 of the present invention.
Figure 3:
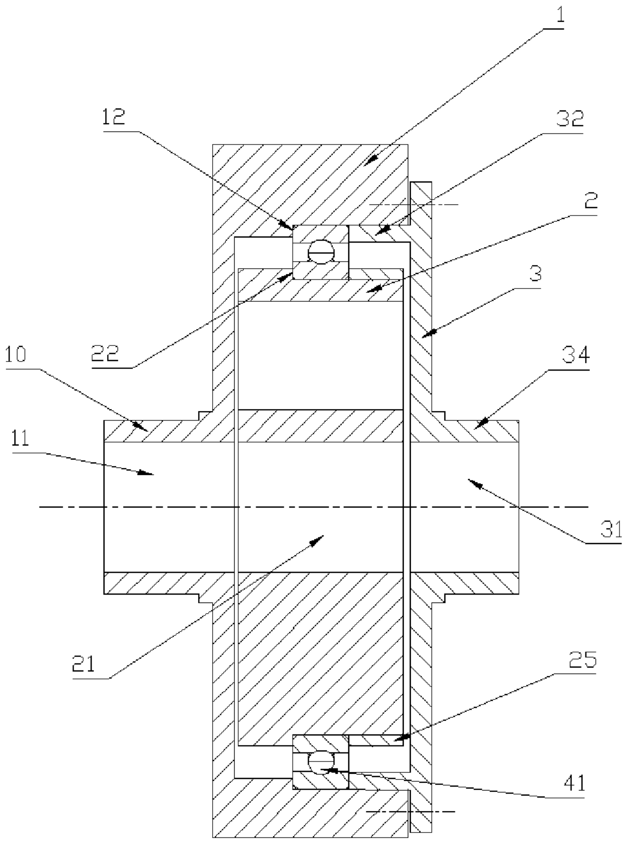
FIG. 3 is a schematic structural diagram of Embodiment 5 and Embodiment 6 of the present invention.

As shown in FIG. 2 and FIG. 3, a vibration device includes an eccentric vibrator, a vibration motor 8 configured to drive the eccentric vibrator to rotate, and a servo linear motion system 9 configured to adjust an eccentricity of the eccentric vibrator.

The eccentric vibrator includes a first eccentric body 1, a second eccentric body 2, and a connecting shaft 5. The first eccentric body 1 and the second eccentric body 2 are arranged in an inside-outside direction. The first eccentric body 1 has an inner circumferential surface, the second eccentric body 2 has an outer circumferential surface, and a first bearing 41 is disposed between the inner circumferential surface of the first eccentric body 1 and the outer circumferential surface of the second eccentric body 2. Centers of gravity of the second eccentric body 2 and the first eccentric body 1 both deviate from a rotation center formed by the connecting shaft 5.

A left pillow block 10 coaxial with the first bearing 41 is disposed in the first eccentric body 1, and a first shaft hole 11 coaxial with the first bearing 41 is provided in the left pillow block 10. An output shaft of the vibration motor 8 is fixed in the first shaft hole 11 of the left pillow block 10 in the first eccentric body 1 by a keyway fit.

Figure 4:
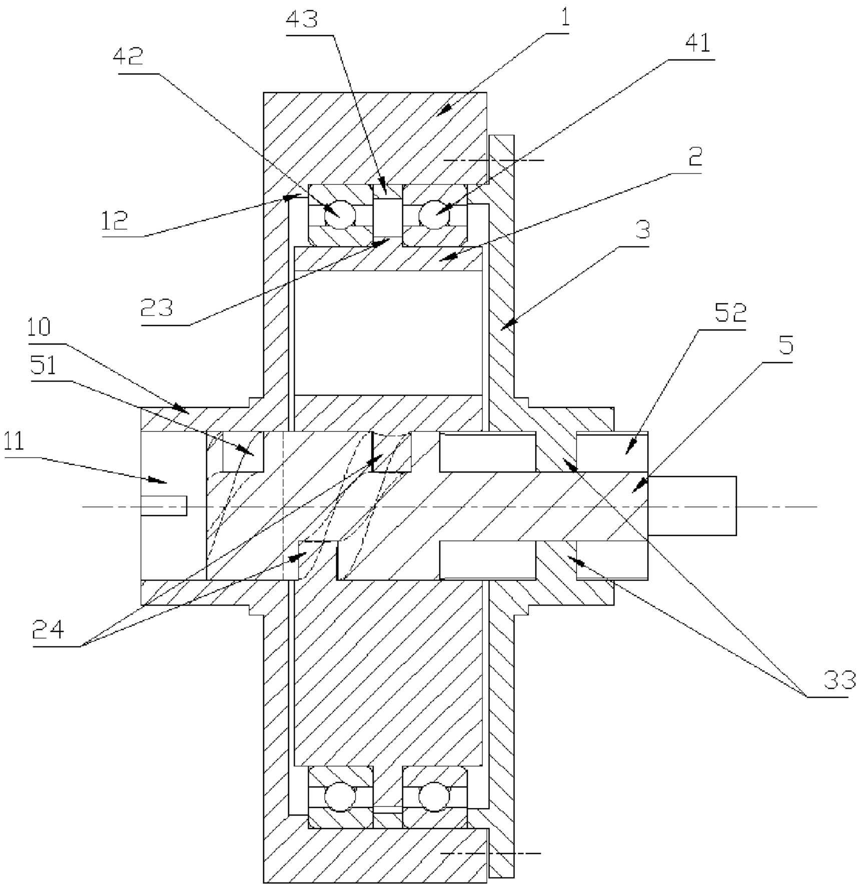
FIG. 4 is a schematic structural diagram of Embodiment 7 of the present invention.

A second shaft hole 21 coaxial with the first bearing 41 is provided in the second eccentric body 2. A right end cover 3 is disposed on a right side of the first eccentric body 1 and the second eccentric body 2, and the right end cover 3 is fixedly connected to the first eccentric body 1. The right end cover 3 is closely attached to a right-side surface of an outer ring of the first bearing 41. A third shaft hole 31 coaxial with the first bearing 41 is disposed at the right end cover 3. As shown in FIG. 4, a first spiral groove 51 and a first linear groove 52 are sequentially disposed from left to right in the connecting shaft 5. A first boss 24 matching the first spiral groove 51 is disposed on an inner wall of the second shaft hole 21 of the second eccentric body 2, and a second boss 33 matching the first linear groove 52 is disposed on an inner wall of the third shaft hole 31 of the right end cover 3.

One or more first bosses 24 may be disposed on a track line matching the first spiral groove 51; and one or more second bosses 33 may be disposed on a track line matching the first linear groove 52.

As shown in FIG. 2, the servo linear motion system 9 is a servo linear motor, and the servo linear motion system actuating mechanism 91 is a screw rod. A shaft hole 92 is provided at a tail end of the screw rod, and the connecting shaft 5 is connected to the screw rod by the shaft hole 92 and then by the third bearing 15. An outer ring of the third bearing 15 is fixedly connected to the shaft hole 92 by a hole elastic retaining ring 13, and an inner ring of the third bearing 15 is fixedly connected to the connecting shaft 5 by a shaft elastic retaining ring 16.

As shown in FIG. 3, a raised pressing ring 32 is disposed on a left side of the right end cover 3, and the pressing ring 32 abuts against the right-side surface of the outer ring of the first bearing 41.

A first inner step surface 12 is disposed on the inner circumferential surface of the first eccentric body 1 in a direction away from an axial center, and a first outer step surface 22 is disposed on the outer circumferential surface of the second eccentric body 2 in a direction toward an axial center. The first inner step surface 12 and the first outer step surface 22 form a first step surface, and left side surfaces of an inner ring and the outer ring of the first bearing 41 are located on the first step surface.

A retaining ring 25 is disposed on the outer circumferential surface of the second eccentric body 2, the retaining ring 25 is located on a right side of the inner ring of the first bearing 41, and the retaining ring 25 is fixedly connected to the second eccentric body 2.

Embodiment 6

Embodiment 6 is the same as Embodiment 5 except that a second spiral groove is provided on an inner wall of the second shaft hole 21 of the second eccentric body 2; a second linear groove is provided on an inner wall of the third shaft hole 31 of the right end cover 3; and a third boss matching the second spiral groove and a fourth boss matching the second linear groove are sequentially disposed from left to right in the connecting shaft 5.

One or more third bosses may be disposed on a track line matching the second spiral groove; and one or more fourth bosses may be disposed on a track line matching the second linear groove.

Embodiment 7

As shown in FIG. 4, Embodiment 7 is the same as Embodiment 5 except that a second bearing 42 is disposed between the first eccentric body 1 and the second eccentric body 2, and a first inner step surface 12 is disposed on the inner circumferential surface of the first eccentric body 1 in a direction away from an axial center, a convex ring 23 is disposed at a middle position of the outer circumferential surface of the second eccentric body 2 in a direction away from an axial center, a space for accommodating the second bearing 42 is formed between a left side step surface of the convex ring 23 and the first inner step surface 12, and a space for accommodating the first bearing 41 is formed between a right-side step surface of the convex ring 23 and the pressing ring 32 of the right end cover 3. A support ring 43 is disposed between the outer ring of the first bearing 41 and an outer ring of the second bearing 42.

Embodiment 8

Embodiment 8 is the same as Embodiment 7 except that a second spiral groove is provided on an inner wall of the second shaft hole 21 of the second eccentric body 2; a second linear groove is provided on an inner wall of the third shaft hole 31 of the right end cover 3; and a third boss matching the second spiral groove and a fourth boss matching the second linear groove are sequentially disposed from left to right in the connecting shaft 5.

One or more third bosses may be disposed on a track line matching the second spiral groove; and one or more fourth bosses may be disposed on a track line matching the second linear groove.

What is claimed is:

1. A vibration device, comprising an eccentric vibrator and a vibration motor configured to drive the eccentric vibrator to rotate, the vibration device further comprising a servo linear motion system configured to adjust an eccentricity of the eccentric vibrator, wherein the eccentric vibrator comprises at least a first eccentric body, a second eccentric body, and a connecting shaft, at least one of the first eccentric body or the second eccentric body is connected to the connecting shaft by a spiral groove and a boss structure engaging the spiral groove, and the servo linear motion system is connected to the connecting shaft;

wherein a servo linear motion system actuating mechanism of the servo linear motion system is connected to the connecting shaft by a third bearing;

wherein a shaft hole is provided at a tail end of the servo linear motion system actuating mechanism of the servo linear motion system, and the connecting shaft is connected to the servo linear motion system actuating mechanism by the shaft hole and then by the third bearing; and an outer ring of the third bearing is fixedly connected to the shaft hole by a hole elastic retaining ring, and an inner ring of the third bearing is fixedly connected to the connecting shaft by a shaft elastic retaining ring.

2. The vibration device according to claim 1, wherein the first eccentric body and the second eccentric body are arranged side by side in a transverse direction, the first eccentric body is a left eccentric body, the second eccentric body is a right eccentric body, and centers of gravity of the second eccentric body and the first eccentric body both deviate from a rotation center formed by the connecting shaft; and the first eccentric body is fixedly connected to an output shaft of the vibration motor, and the servo linear motion system and the connecting shaft are fixedly connected in an axial direction and rotatably connected in a circumferential direction.

3. The vibration device according to claim 2, wherein the first eccentric body is connected to the connecting shaft by the linear groove and the boss structure engaging the linear groove; and the second eccentric body is connected to the connecting shaft by a spiral groove and a boss structure engaging the spiral groove.

4. The vibration device according to claim 3, wherein a left pillow block is part of the first eccentric body, a first shaft hole is provided in the left pillow block, and the output shaft of the vibration motor is fixed on a left part of the first shaft hole by a keyway fit.

5. The vibration device according to claim 4, wherein the linear groove is provided in a right-side part of the first shaft hole, and a first boss engaging the linear groove is disposed on a left side of the connecting shaft; and a second shaft hole is provided in the second eccentric body, a spiral groove is provided in the second shaft hole, and a second boss engaging the spiral groove is provided on a right side of the connecting shaft.

6. The vibration device according to claim 5, wherein at least two first bosses are disposed on a track line engaging the linear groove; and at least two second bosses are disposed on a track line engaging the spiral groove.

7. The vibration device according to claim 5, wherein the linear groove is provided on the left side of the connecting shaft, and a third boss engaging the linear groove is provided in the first shaft hole; and a spiral groove is provided on the right side of the connecting shaft, and a fourth boss engaging the spiral groove is disposed in the second shaft hole.

8. The vibration device according to claim 7, wherein at least two third bosses are disposed on a track line engaging the linear groove; and at least two fourth bosses are disposed on a track line engaging the spiral groove.

9. A vibration device, comprising an eccentric vibrator and a vibration motor configured to drive the eccentric vibrator to rotate, the vibration device further comprising a servo linear motion system configured to adjust an eccentricity of the eccentric vibrator, wherein the eccentric vibrator comprises at least a first eccentric body, a second eccentric body, and a connecting shaft, at least one of the first eccentric body or the second eccentric body is connected to the connecting shaft by a spiral groove and a boss structure engaging the spiral groove, and the servo linear motion system is connected to the connecting shaft;

wherein the first eccentric body and the second eccentric body are arranged in an inside-outside direction, the first eccentric body has an inner circumferential surface, the second eccentric body has an outer circumferential surface, and at least one first bearing is disposed between the inner circumferential surface of the first eccentric body and the outer circumferential surface of the second eccentric body; centers of gravity of the second eccentric body and the first eccentric body both deviate from a rotation center formed by the first bearing; the second eccentric body and the connecting shaft are connected by a spiral groove and a boss structure engaging the spiral groove; the first eccentric body and the connecting shaft are connected by the linear groove and the boss structure engaging the linear groove; and the servo linear motion system and the connecting shaft are fixedly connected in an axial direction and rotatably connected in a circumferential direction of a surface.

10. The vibration device according to claim 9, wherein a servo linear motion system actuating mechanism of the servo linear motion system is connected to the connecting shaft by a third bearing.

11. The vibration device according to claim 10, wherein a shaft hole is provided at a tail end of the servo linear motion system actuating mechanism of the servo linear motion system, and the connecting shaft is connected to the servo linear motion system actuating mechanism by the shaft hole and then by the third bearing; and an outer ring of the third bearing is fixedly connected to the shaft hole by a hole elastic retaining ring, and an inner ring of the third bearing is fixedly connected to the connecting shaft by a shaft elastic retaining ring.

12. The vibration device according to claim 11, wherein the servo linear motion system is a hydraulic cylinder, and the servo linear motion system actuating mechanism is a hydraulic rod.

13. The vibration device according to claim 11, wherein the servo linear motion system is a pneumatic cylinder, and the servo linear motion system actuating mechanism is a pneumatic cylinder rod.

14. The vibration device according to claim 11, wherein the servo linear motion system is a servo linear motor, and the servo linear motion system actuating mechanism is a screw rod.

15. The vibration device according to claim 14, wherein a left pillow block coaxial with the first bearing is disposed in the first eccentric body, and a first shaft hole coaxial with the first bearing is provided in the left pillow block; and an output shaft of the vibration motor is fixedly connected to the first eccentric body by the first shaft hole.

16. The vibration device according to claim 15, wherein the output shaft of the vibration motor is fixed in the first shaft hole of the left pillow block in the first eccentric body by a keyway fit.

17. The vibration device according to claim 16, wherein a second shaft hole coaxial with the first bearing is provided in the second eccentric body; and the connecting shaft and the second shaft hole are connected by a spiral groove and a boss structure engaging the spiral groove.

18. The vibration device according to claim 17, wherein a right end cover is disposed on a right side of the first eccentric body and the second eccentric body, and the right end cover is fixedly connected to the first eccentric body; and the right end cover is closely attached to a right-side surface of an outer ring of the first bearing; a third shaft hole coaxial with the first bearing is disposed at the right end cover; and the connecting shaft and the third shaft hole are connected by the linear groove and the boss structure engaging the linear groove.

19. The vibration device according to claim 18, wherein a raised pressing ring is disposed on a left side of the right end cove, and the pressing ring abuts against the right-side surface of the outer ring of the first bearing.

20. The vibration device according to claim 19, wherein a first inner step surface is disposed on the inner circumferential surface of the first eccentric body in a direction away from an axial center, a first outer step surface is disposed on the outer circumferential surface of the second eccentric body in a direction toward an axial center, the first inner step surface and the first outer step surface form a first step surface, and left side surfaces of an inner ring and the outer ring of the first bearing are located on the first step surface.

21. The vibration device according to claim 20, wherein a retaining ring is disposed on the outer circumferential surface of the second eccentric body, the retaining ring is located on a right side of the inner ring of the first bearing, and the retaining ring is fixedly connected to the second eccentric body.

22. The vibration device according to claim 18, wherein a second bearing is disposed between the first eccentric body and the second eccentric body, a first inner step surface is disposed on the inner circumferential surface of the first eccentric body in a direction away from an axial center, a convex ring is disposed at a middle position of the outer circumferential surface of the second eccentric body in a direction away from an axial center, a space for accommodating the second bearing is formed between a left side step surface of the convex ring and the first inner step surface, and a space for accommodating the first bearing is formed between a right-side step surface of the convex ring and a pressing ring of the right end cover.

23. The vibration device according to claim 22, wherein a support ring is disposed between the outer ring of the first bearing and an outer ring of the second bearing.

24. The vibration device according to claim 18, wherein a first spiral groove and a first linear groove are sequentially disposed from left to right in the connecting shaft; a first boss engaging the first spiral groove is disposed on an inner wall of the second shaft hole of the second eccentric body; and a second boss engaging the first linear groove is disposed on an inner wall of the third shaft hole of the right end cover.

25. The vibration device according to claim 24, wherein at least two first bosses are disposed on a track line engaging the first spiral groove; and at least two second bosses are disposed on a track line engaging the first linear groove.

26. The vibration device according to claim 18, wherein a second spiral groove is provided on an inner wall of the second shaft hole of the second eccentric body; a second linear groove is provided on an inner wall of the third shaft hole of the right end cover; and a third boss engaging the second spiral groove and a fourth boss engaging the second linear groove are sequentially disposed from left to right in the connecting shaft.

27. The vibration device according to claim 26, wherein at least two third bosses are disposed on a track line engaging the second spiral groove; and are at least two fourth bosses are disposed on a track line engaging the second linear groove.

* * * * *